(12) United States Patent
Takeuchi

(10) Patent No.: US 9,384,733 B2
(45) Date of Patent: Jul. 5, 2016

(54) CALL REGISTRATION DEVICE FOR ELEVATOR

(75) Inventor: Nobukazu Takeuchi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 173 days.

(21) Appl. No.: 14/004,483

(22) PCT Filed: Mar. 25, 2011

(86) PCT No.: PCT/JP2011/057352
§ 371 (c)(1),
(2), (4) Date: Sep. 11, 2013

(87) PCT Pub. No.: WO2012/131839
PCT Pub. Date: Oct. 4, 2012

(65) Prior Publication Data
US 2014/0006034 A1    Jan. 2, 2014

(51) Int. Cl.
*G10L 15/22*  (2006.01)
*B66B 1/46*   (2006.01)

(52) U.S. Cl.
CPC ............. *G10L 15/22* (2013.01); *B66B 1/468* (2013.01); *B66B 2201/4646* (2013.01)

(58) Field of Classification Search
CPC ....... G10L 15/265; G10L 15/22; G10L 15/30; G06F 3/16; H04M 2201/40
See application file for complete search history.

(56) References Cited

U.S. PATENT DOCUMENTS

| | | | | |
|---|---|---|---|---|
| 4,534,056 A | * | 8/1985 | Feilchenfeld et al. | ........ 704/272 |
| 4,558,298 A | * | 12/1985 | Kawai et al. | .................. 187/380 |
| 4,590,604 A | * | 5/1986 | Feilchenfeld | ................. 704/272 |

(Continued)

FOREIGN PATENT DOCUMENTS

| | | |
|---|---|---|
| JP | 1 247378 | 10/1989 |
| JP | 3 98967 | 4/1991 |

(Continued)

OTHER PUBLICATIONS

Combined Office Action and Search Report issued Jan. 6, 2015 in Chinese Patent Application No. 201180069079.8 (with partial English language translation and English Translation of Category of Cited Documents).

(Continued)

*Primary Examiner* — Fariba Sirjani
(74) *Attorney, Agent, or Firm* — Oblon, McClelland, Maier & Neustadt, L.L.P.

(57) ABSTRACT

A call registration device for an elevator includes a voice input section which receives input of a user's voice, a voice recognition section which stores beforehand a predetermined call registration command representing a destination floor and a predetermined start command used for starting voice recognition of a call registration and which differs from the call registration command, the voice recognition section also performing voice recognition by judging whether the inputted voice is the call registration command or the start command, a call registration control section which, if the inputted voice was the call registration command, outputs a call registration request to the destination floor of the relevant call registration command, and a start command changing part which changes a start command which becomes effective by a predetermined condition. If the inputted voice is a start command made effective, the voice recognition section starts voice recognition of a call registration.

3 Claims, 2 Drawing Sheets

| MORNING 03:00AM~00:00PM | DAYTIME 10:00AM~05:00PM | NIGHT 03:00am~06:00PM |
|---|---|---|
| MORNING GOOD MORNING | | |
| | GOOD AFTERNOON | |
| | | GOOD EVENING |

(56) References Cited

U.S. PATENT DOCUMENTS

| | | | |
|---|---|---|---|
| 4,958,707 A * | 9/1990 | Yoneda et al. | 187/247 |
| 5,255,341 A * | 10/1993 | Nakajima | 704/200 |
| 5,952,626 A * | 9/1999 | Zaharia | 187/381 |
| 6,003,637 A * | 12/1999 | Kim et al. | 187/391 |
| 6,223,160 B1 * | 4/2001 | Kostka et al. | 704/275 |
| 6,397,976 B1 * | 6/2002 | Hale et al. | 187/392 |
| 6,510,924 B2 * | 1/2003 | Bauer et al. | 187/380 |
| 6,828,918 B2 * | 12/2004 | Bowman et al. | 340/4.1 |
| 7,254,559 B2 * | 8/2007 | Florance et al. | 705/51 |
| 7,299,187 B2 * | 11/2007 | Tahara et al. | 704/275 |
| 7,373,300 B1 * | 5/2008 | Bangalore et al. | 704/270.1 |
| 7,451,085 B2 * | 11/2008 | Rose | G10L 15/08 704/244 |
| 7,516,190 B2 * | 4/2009 | Kurganov | G10L 15/26 704/270.1 |
| 7,711,565 B1 * | 5/2010 | Gazdzinski | 704/270 |
| 8,352,246 B1 * | 1/2013 | Lloyd | G10L 15/183 704/9 |
| 8,996,381 B2 * | 3/2015 | Mozer et al. | 704/270 |
| 2002/0036122 A1 * | 3/2002 | Fayette | B66B 3/00 187/391 |
| 2004/0060777 A1 * | 4/2004 | Takeuchi | 187/391 |
| 2004/0230436 A1 * | 11/2004 | Sugawara et al. | 704/275 |
| 2005/0080630 A1 * | 4/2005 | Mills et al. | 704/276 |
| 2005/0114141 A1 * | 5/2005 | Grody | G10L 15/30 704/270 |
| 2005/0252723 A1 * | 11/2005 | Takeuchi | 187/380 |
| 2006/0074658 A1 * | 4/2006 | Chadha | 704/246 |
| 2006/0144645 A1 * | 7/2006 | Yamakawa | 187/391 |
| 2006/0224383 A1 * | 10/2006 | Lee et al. | 704/252 |
| 2006/0235684 A1 * | 10/2006 | Chang | G10L 15/30 704/233 |
| 2007/0185702 A1 * | 8/2007 | Harney et al. | 704/4 |
| 2007/0225983 A1 * | 9/2007 | Maringo et al. | 704/270 |
| 2008/0059186 A1 * | 3/2008 | Mowatt et al. | 704/257 |
| 2008/0140415 A1 * | 6/2008 | Shostak | 704/270.1 |
| 2008/0165937 A1 * | 7/2008 | Moore | 379/88.04 |
| 2008/0167871 A1 * | 7/2008 | Kim et al. | 704/246 |
| 2008/0177542 A1 * | 7/2008 | Yamamoto | 704/253 |
| 2009/0204410 A1 * | 8/2009 | Mozer et al. | 704/275 |
| 2009/0326937 A1 * | 12/2009 | Chitsaz | G10L 15/24 704/235 |
| 2010/0131275 A1 * | 5/2010 | Paek | 704/257 |
| 2010/0174546 A1 * | 7/2010 | Kim et al. | 704/275 |
| 2010/0332236 A1 * | 12/2010 | Tan | 704/275 |
| 2011/0054900 A1 * | 3/2011 | Phillips | G10L 15/30 704/235 |
| 2011/0125503 A1 * | 5/2011 | Dong et al. | 704/275 |
| 2011/0166855 A1 * | 7/2011 | Vermeulen et al. | 704/231 |
| 2011/0168499 A1 * | 7/2011 | Takeuchi | 187/389 |
| 2012/0075184 A1 * | 3/2012 | Madhvanath | G10L 15/24 345/161 |
| 2014/0006034 A1 * | 1/2014 | Takeuchi | 704/275 |
| 2014/0278435 A1 * | 9/2014 | Ganong, III | G10L 15/22 704/275 |

FOREIGN PATENT DOCUMENTS

| | | |
|---|---|---|
| JP | 4 129976 | 4/1992 |
| JP | 6 255911 | 9/1994 |
| JP | 2000 80828 | 3/2000 |
| JP | 2000 194393 | 7/2000 |
| JP | 2007 186280 | 7/2007 |
| JP | 2010 254437 | 11/2010 |

OTHER PUBLICATIONS

Office Action issued Mar. 5, 2015 in Korean Patent Application No. 10-2013-7028088 (with partial English language translation).
International Preliminary Report on Patentability and Written Opinion issued Oct. 10, 2013, in International application No. PCT/JP2011/057352.
International Search Report Issued Dec. 13, 2011 in PCT/JP11/057352 Filed Mar. 25, 2011.
Office Action issued Dec. 16, 2014 in Korean Patent Application No. 10-2013-7028088 (with English language translation).

* cited by examiner

| MORNING<br>03:00AM~00:00PM | DAYTIME<br>10:00AM~05:00PM | NIGHT<br>03:00am~06:00PM |
|---|---|---|
| MORNING<br>GOOD MORNING | | |
| | GOOD AFTERNOON | |
| | | GOOD EVENING |

CALL REGISTRATION DEVICE FOR ELEVATOR

TECHNICAL FIELD

The present invention relates to a call registration device for an elevator.

BACKGROUND ART

In an elevator which performs car call registrations by button operations, car call registrations by button operations are sometimes difficult, for example, in the case where the user is visually handicapped, in the case where a user carries things, and in the case where the elevator is very crowded. Therefore, there has hitherto been known an elevator provided with a call registration device which permits call registrations by voice input without requiring manual button operations. When a voice uttered by a user is inputted to a voice input section, such as a microphone, this call registration device for an elevator recognizes the inputted voice and performs the registration of a call to a destination floor and the like uttered by the user. However, in such a call registration device for an elevator, due to the effect of environmental noises and the like in places where voice input is performed, there is a possibility that a wrong call is registered.

Therefore, in conventional call registration devices for an elevator, there are known call registration devices for an elevator which are such that a voice input section, such as a microphone, is provided in an elevator hall, human detection means which detects whether or not a user stands in front of this voice input section is provided, and only when this human detection means detects a user, the voice inputted to the voice input section is recognized and a call registration is performed (for example, refer to Patent Literature 1 and Patent Literature 2). In the call registration devices described in Patent Literature 1 and Patent Literature 2, an ultrasonic sensor, an infrared sensor, an optical sensor, and a mat sensor are used as human detection means.

The call registration device described in Patent Literature 2 is provided with a voice output section consisting of a speaker for notifying, by voice, a user of results of a call registration by voice recognition and the like. And so that a voice uttered from this voice output section does not interfere with voice recognition during a call registration, the recognition of the voice inputted to the voice input section is prohibited while the voice output section is outputting the voice.

In conventional call registration devices for an elevator using the voice recognition, in addition to the above-described call registration devices for an elevator, there are also known those provided with an indication device which indicates to a user the contents of recognition when the voice inputted to a voice input section is recognized (for example, refer to Patent Literature 3).

In fields other than call registration devices for an elevator, in a voice recognition control device which recognizes a voice inputted to a voice input section and executes an execution command, there have hitherto been known those which, in the case where a voice inputted to a voice input section has been recognized as a predetermined start command, starts the voice recognition of an execution command and the execution of the execution command for which voice recognition has been carried out (for example, refer to Patent Literature 4).

CITATION LIST

Patent Literature

Patent Literature 1: Japanese Patent Laid-Open No. 01-247378
Patent Literature 2: Japanese Patent Laid-Open No. 03-098967
Patent Literature 3: Japanese Patent Laid-Open No. 06-255911
Patent Literature 4: Japanese Patent Laid-Open No. 2000-194393

SUMMARY OF INVENTION

Technical Problem

However, in the conventional call registration devices for an elevator described in Patent Literature 1 and Patent Literature 2, there arises a problem that when the human detection means has performed erroneous detection, also the voice recognition ceases to function rightly. In addition, in the conventional call registration device for an elevator described in Patent Literature 2, there arises a problem that because voice recognition is prohibited while the voice output section is outputting a voice, it is difficult for a user to get to know the timing at which a call registration by voice recognition is possible.

Furthermore, the conventional call registration device for an elevator described in Patent Literature 3 poses a problem that because erroneous registration is to be suppressed by indicating the contents of voice recognition on the indication device, it is impossible for a user whose sense of sight of is inadequate to check the contents of indication on the indication device and hence this function is ineffective as well as a problem that the manufacturing cost of products increases due to the provision of the indication device.

Furthermore, in the conventional voice recognition control device described in Patent Literature 4, because a start command for starting the voice recognition of an execution command is fixed, there arises a problem that depending on the condition of the device, periods of time when the device is used, and the like, the start command itself may become apt to be erroneously recognized or become unnatural.

The present invention was made to solve such problems as described above and provides a call registration device for an elevator which can suppress erroneous registration of calls by voices other than a voice uttered by a user for call registration and can start voice recognition for a call registration through the use of a start command which is not unnatural and is not easily erroneously recognized.

Means for Solving the Problems

A call registration device for an elevator according to the present invention, which performs a call registration by voice recognition using a voice input section which receives the input of a voice uttered by a user of the elevator, comprises: a voice recognition section which stores beforehand voice data of a predetermined call registration command representing a destination floor or direction of the call registration and voice data of a predetermined start command which is used for starting voice recognition of a call registration command, and which is different from the call registration command and does not include the call registration command, wherein the voice recognition section also performs the voice recognition by judging whether or not a voice inputted to the voice input section matches either the voice data of the stored call registration command or the voice data of the start command; a call registration control section which, in the case where the voice inputted to the voice input section was judged to match the voice data of the call registration command, outputs to an elevator control device a call registration request to the destination floor or direction represented by the relevant matched call registration command; a start command changing part which changes, according to predetermined condition, the start command which becomes effective among the start commands stored by the voice recognition section, wherein in the case where the voice recognition section judges that the voice inputted to the voice input section matched the voice data of the start command made effective by the start command changing part, the voice recognition section starts the voice recognition as to whether or not the voice inputted to the voice input section matches the voice data of the call registration command.

Advantageous Effect of Invention

In the call registration device for an elevator of the present invention, it is possible to suppress erroneous registration of calls by voices other than a voice uttered by a user for call registration and to produce the effect that it is possible to start voice recognition for a call registration through the use of a start command which is not unnatural and is not apt to be erroneously recognized, either.

DESCRIPTION OF EMBODIMENTS

Embodiment 1

Figure 1:
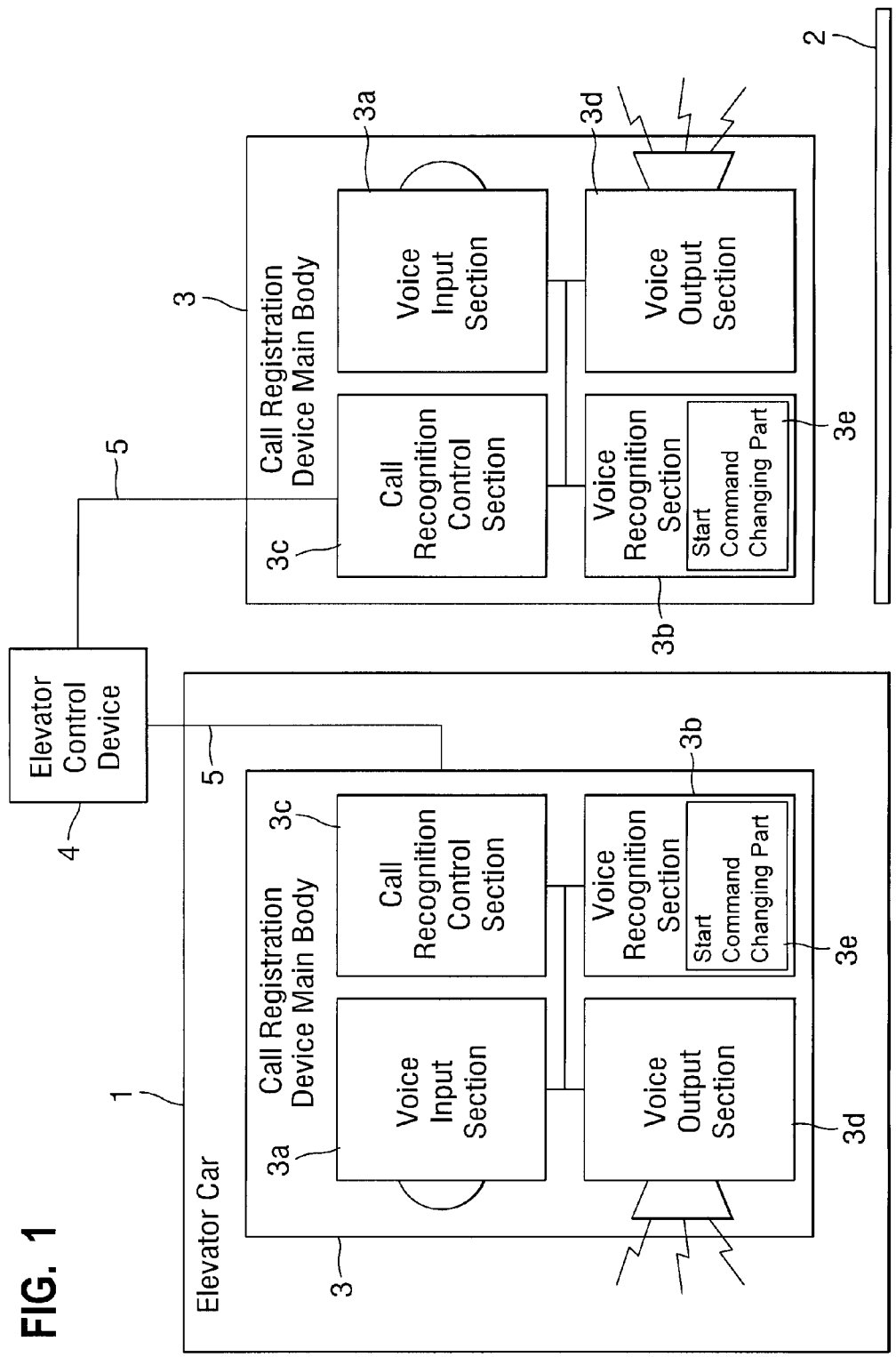
FIG. 1 is a block diagram showing the general configuration of the call registration device for an elevator relating to Embodiment 1 of the present invention.
Figures 2, 3:
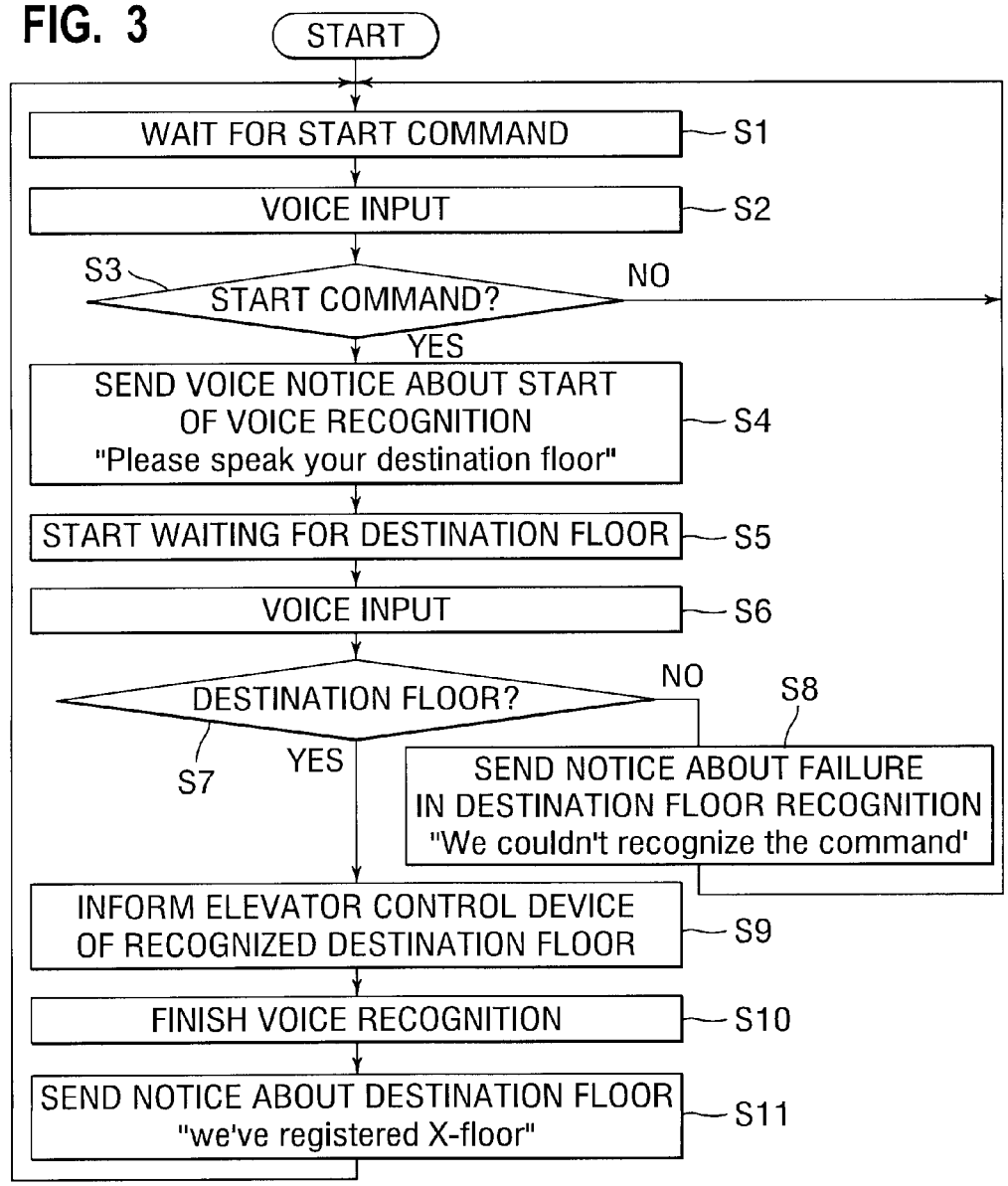
FIG. 2 is a diagram to explain an exemplary setting of a voice recognition start command of the call registration device for an elevator relating to Embodiment 1 of the present invention.
FIG. 3 is a flowchart showing the actions of the call registration device for an elevator relating to Embodiment 1 of the present invention.

FIG. 1 to FIG. 3 relate to Embodiment 1 of the present invention. FIG. 1 is a block diagram showing the general configuration of the call registration device for an elevator, FIG. 2 is a diagram to explain an exemplary setting of a voice recognition start command of the call registration device for an elevator, and FIG. 3 is a flowchart showing the actions of the call registration device for an elevator.

In FIG. 1, reference numeral 1 denotes a car loaded with elevator users which ascends and descends in a shaft, which is not shown in the figure. Each floor at which this car 1 stops is provided with a hall 2 used by users in boarding and alighting the car 1.

At least either in the car 1 or each of the halls 2 is provided with a call registration device main body 3 by use of which an elevator user registers a desired call. FIG. 1 shows an example in which this call registration device main body 3 is provided in both the car 1 and the hall 2. The call registration device main body 3 is provided with a voice input section 3a, a voice recognition section 3b, a call registration control section 3c, and a voice output section 3d.

The voice input section 3a is intended for receiving the input of a voice uttered by a user. This voice input section 3a consists of a device which converts the sound waves of, for example, a microphone to an electrical signal. And the voice inputted to the voice input section 3a is converted by this voice input section 3a to a voice signal and is outputted.

The voice signal outputted from the voice input section 3a is inputted to the voice recognition section 3b. The voice data of a predetermined call registration command is stored beforehand in this voice recognition section 3b. And the voice recognition section 3b performs voice recognition processing by performing comparative checking of the voice inputted to the voice input section 3a against the voice data stored beforehand in the voice recognition section 3b.

The call registration command voice data is voice data of call registration command (waveform data on voice signals) which consists of a vocabulary representing destination floors of call registration (for example, "first" and "first floor" representing the first floor and "second" and "second floor" representing the second floor. Also, the vocabulary may be a floor name, such as "main floor" representing the main floor, and the names of representative facilities present on the floor instead of a floor number).

In the call registration device main body 3 installed in the hall 2, a vocabulary representing the direction of a call (for example, "up" representing the upward direction and "down" representing the downward direction) may be included as a call registration command.

The voice recognition section 3b first cuts out an utterance division which is a voice part uttered by a user from the voice signal outputted from the voice input section 3a. And the voice recognition section 3b performs the comparative checking of the voice signal of this cut-out utterance division against the voice signal of the voice data of the call registration command, thereby performing voice recognition by judging whether or not the voice inputted to the voice input section 3a matches any of the call registration command voice data.

Results of the voice recognition by this voice recognition section 3b are outputted to the call registration control section 3c. The call registration control section 3c is communicatively connected by a communication path 5 to an elevator control device 4 which governs the control of the whole operation and action of the elevator. The call registration control section 3c outputs a call registration request to the elevator control device 4 on the basis of the results of the voice recognition outputted from the voice recognition section 3b.

In the case where results of the voice recognition in the voice recognition section 3b reveal that the voice inputted to the voice input section 3a matched the call registration command, the call registration control section 3c outputs a call registration request to the destination floor or direction corresponding to this matched call registration command to the elevator control device 4. The elevator control device 4 which received the call registration request from the call registration control section 3c performs the registration of a call for the destination floor or direction designated by the relevant call registration request. At the same time, the call registration control section 3c outputs information regarding the destination floor or direction of the outputted call registration request to the voice output section 3d.

This voice output section 3d is intended for informing a user of various kinds of information regarding the condition of the elevator including results of voice recognition and results of call registration. The voice output section 3d has a speaker and the like which sounds voices. And the voice output section 3d can inform a user of various kinds of information by broadcasting a voice announcement which is set beforehand from this speaker and the like.

As described above, in the case where a call registration command was recognized by the voice recognition section 3b, a call registration request for the destination floor or direction corresponding to the relevant call registration command is outputted from the call registration control section 3c to the elevator control device 4. At the same time, information regarding the destination floor or direction of the relevant call registration request is outputted from the voice call registration section 4 to the voice output section 3d. The voice output section 3d which received the information regarding the destination floor or direction of this call registration request informs a user by voice announcement of results of voice recognition, i.e., results of call registration on the basis of this received information. As a concrete voice announcement on this occasion, for example, "We've registered X-floor" (X is a numeral representing a destination floor) is conceivable.

In the case where although a voice was inputted to the voice input section 3a, the inputted voice did not match any of the call registration commands which had been set beforehand and no call registration command was recognized by the voice recognition section 3b, the voice output section 3d outputs a voice announcement to the effect that the voice recognition section 3b failed in the recognition of the call registration command. As a concrete voice announcement on this occasion, for example, "We couldn't recognize the command" is conceivable. On the basis of this voice announcement from the voice output section 3d, a user can get to know whether or not the destination floor or direction desired by himself or herself was recognized.

In addition to the call registration command voice data, predetermined start command voice data is also stored beforehand in the voice recognition section 3b. This start command voice data is voice data of a start command consisting of a specific vocabulary for starting the voice recognition of a call registration command. The vocabulary of this start command is set to be different from a vocabulary consisting of a call registration command and does not include a vocabulary constituting a call registration command. Here, words of greetings usually used in daily conversations (for example, "Good morning", "Good afternoon", "Good evening") are set as start commands. In this manner, words of greetings usually used in daily conversations are used as a start command, whereby voice recognition becomes possible in natural dialogs.

In normal times, the voice recognition section 3b does not perform the checking of a voice inputted to the voice input section 3a against a call registration command, that is, the voice recognition section 3b does not perform the recognition of a call registration command. Instead of this, in normal times, the voice recognition section 3b performs the checking of a voice inputted to the voice input section 3a against a start command, that is, the voice recognition section 3b performs the recognition of a start command. And in the case where the checking of a voice inputted to the voice input section 3a against a start command (recognition of a start command) was successful, the checking of a voice inputted to the voice input section 3a against a call registration command (recognition of a call registration command) is started.

Therefore, in normal times, only after a user utters a start command and this start command is recognized by the voice recognition section 3b, a call registration by the utterance of a call registration command becomes possible. When after the recognition of a start command by the voice recognition section 3b, a call registration command is recognized and a call is registered, the voice recognition section 3b suspends the recognition of a call registration command until a start command is recognized again. Also in the case where after the recognition of a start command by the voice recognition section 3b, a predetermined given time elapses without the recognition of a call registration command, the voice recognition section 3b suspends the recognition of a call registration until a start command is recognized again. On this occasion, the voice output section 3d makes a voice announcement to the effect that the receiving of a call registration command is finished.

Or it may be ensured that until the voice recognition section 3b recognizes a start command, even when a call registration command is recognized, a call registration request is not outputted from the call registration control section 3c so that a call is not registered.

A plurality of vocabularies different from each other are set in a start command. That is, a plurality of start commands different from each other are stored beforehand in the voice recognition section 3b. And the voice recognition section 3b is provided with a start command changing part 3e which changes and selects a start command which becomes effective among these multiple start commands under a predetermined condition. And the predetermined condition under which the start command changing part 3e changes an effective start command is, here, to which time division of the day fixed beforehand the present time belongs. As a result of this, it is possible to change a start command in such a manner as to suit a time division of the day and it becomes possible to perform voice recognition by a natural dialog suited to a time division of the day which a user uses.

FIG. 2 shows a predetermined condition for changing an effective start command by the start command changing part 3e and specific examples of a start command which becomes effective on that occasion. Here, three time divisions of the day, i.e., morning (3 a.m. to 0 p.m.), daytime (10 a.m. to 5 p.m.) and night (3 p.m. to 6 p.m.) are set as time division of the day. And in each time division of the day, setting is performed so that words of greetings usually used in daily conversations are selected in each time division of the day.

Specifically, in the morning time division of the day, "Morning" and "Good morning" are set as start commands. In the daytime time division of the day, "Good afternoon" is set as a start command. In the night time division of the day, "Good evening" is set as a start command. Here, the time divisions of the day may include hours overlapping together. In the hours where the time divisions of the day overlap each other, as a matter of course, two start commands effective in a plurality of time divisions of the day to which the overlapping hours belong, are effective.

In the example of FIG. 2, from 10 a.m. to 0 p.m. when the morning and daytime time divisions of the day overlap each other, both of the start commands for the morning and daytime time divisions of the day are effective. And from 3 p.m. to 5 p.m. when the daytime and night time divisions of the day overlap each other, both of the start commands for the daytime and night time divisions of the day are effective.

In this embodiment, the call registration device for an elevator acts according to a series of actions of flow shown in FIG. 3.

First, in normal times, the call registration device main body 3 is in a state of waiting for a start command (Step S1). And when a voice uttered by a user is inputted to the voice input section 3a (Step S2), in Step S3 the voice recognition section 3b ascertains whether or not the voice inputted to the voice input section 3a in Step S2 matches a predetermined start command which is changed and selected by the start command changing part 3e and is effective at present. In the case where the inputted voice did not match the start command, the flow of actions returns to Step S1.

On the other hand, in the case where the inputted voice matched the start command, the flow of actions proceeds to Step S4. In this Step S4, the voice output section 3d sends a notice to the effect that voice recognition of a call registration command has been started. As this concrete voice announcement, for example, "Please speak your destination floor" is conceivable. And in succeeding Step S5, the call registration device main body 3 starts waiting for a destination floor (a call registration command). That is, the voice recognition section 3b starts the recognition of a call registration command.

And when a voice is inputted to the voice input section 3a in this state of waiting for a destination floor (Step S6), the flow of actions proceeds to Step S7, where the voice recognition section 3b ascertains whether or not the voice inputted in Step S6 matches a predetermined call registration command. In the case where the inputted voice did not match the call registration command, the flow of actions proceeds to Step S8, where the voice output section 3d sends a notice about a failure in the recognition of the destination floor (call registration command) by the announcement "We couldn't recognize the voice." And the flow of actions returns to Step S1.

On the other hand, in the case where in Step S7 the inputted voice matched the call registration command, the voice recognition section 3b succeeded in the recognition of the call registration command and the flow of action proceeds to Step S9. In this Step S9, a call registration request to the destination floor of the relevant recognized call registration command is sent from the call registration control section 3c to the elevator control device 4, whereby the elevator control device 4 is informed of the destination floor of the relevant recognized call registration command.

And when a call registration is performed in the elevator control device 4, the flow of actions proceeds to Step S10, where the voice recognition section 3b of the call registration device main body 3 finishes the voice recognition. And in succeeding Step S11, the voice output section 3d sends a notice about the destination floor of the registered call (for example, the announcement "We've registered X-floor" (X is a numeral representing a destination floor) is made), and the call registration device main body 3 returns to the state of waiting for a start command in Step S1.

The voice recognition section 3b may be formed from a microcomputer, a memory and the like. On this occasion, a memory may be built in the microcomputer. Furthermore, the configuration may be such that part of the functions of the call registration control section 3c, the voice input section 3a, and the voice output section 3d is provided by a microcomputer and the like. By using a microcomputer and the like in this manner, it is possible to constitute the call registration device by general parts and, therefore, it is possible to reduce the manufacturing cost.

As a predetermined condition for changing an effective start command by the start command changing part 3e, the use of the operating condition of the elevator is conceivable in addition to time divisions of the day.

Furthermore, in this embodiment, the start command changing part 3e is provided in the voice recognition section 3b of the call registration device main body 3. However, the place where this start command changing part 3e is provided is not limited to the voice recognition section 3b alone; for example, this start command changing part 3e may be provided within the elevator control device 4.

In the call registration device for an elevator configured as described above, it is ensured that in the case where a predetermined start command has been recognized, the voice recognition of a call registration command is started. Therefore, a user can easily grasp the timing at which a call registration command is to be uttered and it is possible to suppress erroneous registration of calls by voices other than the voice uttered by the user for call registration. And furthermore, because it is possible to automatically change a start command according to the operating condition and periods of use time for an elevator, it is possible to start voice recognition for call registration by a start command which is not unnatural and is not apt to be erroneously recognized, either.

INDUSTRIAL APPLICABILITY

The present invention can be used in a call registration device for an elevator which performs call registration by voice recognition using a voice input section which receives the input of a voice uttered by an elevator user.

DESCRIPTION OF SYMBOLS 1 car
2 hall
3 call registration device main body
3a voice input section
3b voice recognition section
3c call registration control section
3d voice output section
3e start command changing part
4 elevator control device
5 communication path

The invention claimed is:

1. A call registration device for an elevator which performs a call registration by voice recognition using a voice section which receives the input of a voice uttered by a user of the elevator, comprising:
   a voice recognition section which stores beforehand voice data of a predetermined call registration command representing a destination floor or direction of the call registration and voice data of a predetermined start command which is used for starting voice recognition of a call registration command, and which is different from the call registration command and does not include the call registration command, wherein the voice recognition section also performs the voice recognition by judging whether or not a voice inputted to the voice input section matches either the voice data of the stored call registration command or the voice data of the start command;
   a call registration control section which, in a case the voice inputted to the voice input section was judged to match the voice data of the call registration command, outputs to an elevator control device a call registration request to the destination floor or direction represented by the relevant matched call registration command;
   a start command changing part which changes, according to predetermined condition which includes at least a point as to whether or not a present time belongs to a time division of the day determined beforehand, the start command which becomes effective among the start commands stored by the voice recognition section,
   wherein in a case the voice recognition section judges that the voice inputted to the voice input section matched the voice data of the start command made effective by the start command changing part, the voice recognition section starts the voice recognition as to whether or not the voice inputted to the voice input section matches the voice data of the call registration command.

2. The call registration device for an elevator according to claim 1, wherein the start command includes at least the words of greetings used in daily conversations.

3. A call registration device for an elevator which performs a call registration by voice recognition using a voice input section which receives the input of a voice uttered by a user of the elevator, comprising:

circuitry configured to:

store beforehand, voice data of a predetermined call registration command representing a destination floor or direction of the call registration and voice data of a predetermined start command which is used for starting voice recognition of a call registration command, and which is different from the call registration command and does not include the call registration command, wherein the voice recognition section also performs the voice recognition by judging whether or not a voice inputted to the voice input section matches either the voice data of the stored call registration command or the voice data of the start command;

output, in a case the voice inputted to the voice input section was judged to match the voice data of the call registration command, to an elevator control device a call registration request to the destination floor or direction represented by the relevant matched call registration command; and change, according to predetermined condition which includes at least a point as to whether or not a present time belongs to a time division of the day determined beforehand, the start command which becomes effective among the start commands stored, wherein in a case the voice inputted to the voice input section matched the voice data of the start command made effective, the voice recognition is started as to whether or not the voice inputted matches the voice data of the call registration command.

* * * * *